(12) United States Patent
Yamakami

(10) Patent No.: US 8,786,617 B2
(45) Date of Patent: Jul. 22, 2014

(54) PARALLELIZATION OF RANDOM NUMBER GENERATION PROCESSING BY EMPLOYING GPU

(75) Inventor: Tomohisa Yamakami, Chiyoda-ku (JP)

(73) Assignee: Mizuho-DL Financial Technology Co. Ltd., Chiyoda-Ku, Tokyo (JP)

( * ) Notice: Subject to any disclaimer, the term of this patent is extended or adjusted under 35 U.S.C. 154(b) by 732 days.

(21) Appl. No.: 13/038,813

(22) Filed: Mar. 2, 2011

(65) Prior Publication Data

US 2012/0105462 A1    May 3, 2012

(30) Foreign Application Priority Data

Oct. 28, 2010    (JP) .................... 2010-242141

(51) Int. Cl.
*G06F 15/80*    (2006.01)
(52) U.S. Cl.
USPC .......................................... 345/505
(58) Field of Classification Search
USPC .......................................... 345/505
See application file for complete search history.

(56) References Cited

U.S. PATENT DOCUMENTS

2007/0294508 A1    12/2007    Sussman et al.

FOREIGN PATENT DOCUMENTS

JP    2005-038229 A    2/2005
JP    2009-86202 A    4/2009

OTHER PUBLICATIONS

Makoto Matsumoto, et al., Mersenne Twister: A 623-Dimensionally Equidistributed Uniform Pseudo-Random Number Generator, ACM Transactions on Modeling and Computer Simulation, vol. 8, No. 1, Jan. 1998, pp. 3-30.
Office Action (Reasons for Rejection) dated Feb. 14, 2012, issued in the corresponding Japanese Patent Application No. 2010-242141, and an English Translation thereof. (4 pages).
Moro B., "The Full Monte" Risk Magazine, (1995), vol. 8, No. 2, pp. 57-58.

*Primary Examiner* — Hau Nguyen
(74) *Attorney, Agent, or Firm* — Buchanan Ingersoll & Rooney PC

(57) ABSTRACT

A method of carrying out random number generation processing uses a GPU including a plurality of blocks each including at least one core, the random number generation processing including update processing of updating state vectors and conversion processing of converting the updated state vectors into random numbers having another distribution. The method includes carrying out, by one of the plurality of blocks, the update processing (S3), and carrying out, by the plurality of blocks, the conversion processing in parallel based on results of the update processing (S9). Therefore, it is possible to more efficiently generate a random number sequence which is the same as the one obtained through random number generation processing performed in a serial manner, by parallelizing a single random number generator in a GPU.

12 Claims, 7 Drawing Sheets

PARALLELIZATION OF RANDOM NUMBER GENERATION PROCESSING BY EMPLOYING GPU

BACKGROUND OF THE INVENTION

1. Field of the Invention

The present invention relates to processes for generating random numbers using a graphics processing unit (GPU).

2. Description of Related Art

The GPU is a device specialized for carrying out image processing, such as for computer graphics (CG), at high speed, and it is usually integrated into a computer device, such as a personal computer or a workstation, for displaying images. The GPU has theoretical performance far exceeding that of a general-purpose central processing unit (CPU) and is inexpensive, and it is thus employed for scientific computing and the like as well as for its original image processing purpose (refer to Japanese Patent Application Laid-open No. 2009-86202). A computing method that employs the GPU is referred to as GPU computing.

FIG. 4 is a block diagram of a computing device provided with a GPU. As illustrated in FIG. 4, the computing device includes a CPU 1, a main memory 2, a GPU 3, a GPU memory 4, an input device 5 including a keyboard and a mouse, a display device 6 such as a liquid crystal display, and a bus 7 for connecting those components with each other. The GPU 3 includes a plurality of blocks each constructed of computing units referred to as cores (not shown). The cores in the same block can share data at high speed. On the other hand, sharing data between a core in one block and a core in another block must be realized via the GPU memory 4, which is a global memory, resulting in relatively low speed. Moreover, the GPU memory 4 has a variable data storage area, and is directly accessed by the GPU 3 for reading and writing data. Although the CPU 1 cannot directly access the GPU memory 4, the CPU 1 can access the GPU memory 4 via the GPU 3.

The GPU has a larger number of cores compared with the CPU. Therefore, the GPU has higher computing performance than the CPU. On the other hand, the respective cores in the GPU can carry out only the same arithmetic operation at the same time, and have a stricter restriction imposed on parallelism compared with the CPU. Accordingly, problems for which the GPU can perform well are thus limited. Moreover, the architecture of the GPU is greatly different from that of the CPU, and the direct application of a program code intended for the CPU cannot sufficiently utilize the performance of the GPU. It is thus necessary to rewrite the program code intended for the CPU according to an algorithm and a processing sequence suited to the GPU.

The Monte Carlo method used for analyzing probabilistic phenomena and the like is one of the fields in which the GPU best exhibits its performance. A large amount of random numbers are used for executing the Monte Carlo method, and the quality of those random numbers affects execution results of the Monte Carlo method. In view of the above, a random number generator which can generate high-quality random number sequences at high speed is thus necessary. Moreover, while random numbers generated by a random number generator are usually uniform random numbers, random numbers used for the Monte Carlo method need to follow a distribution according to specific needs, hence the uniform random numbers generated by the random number generator must be converted into random numbers following a proper distribution.

The Mersenne Twister random number generator, which generates high-quality random numbers at high speed, was developed and published in the period from 1996 to 1998 (refer to M. Matsumoto and T. Nishimura, "Mersenne Twister: A 623-dimensionally equidistributed uniform pseudorandom number generator", ACM Trans. on Modeling and Computer Simulation, January, 1998, Vol. 8, No. 1, pp. 3-30). A typical example thereof is a standard code in the 2002 version written in the C language for the CPU (hereinafter, referred to as mt19937ar). In addition, the Mersenne Twister for Graphic Processors (MTGP) written for the GPU was published in 2009. Refer to M. Matsumoto, "Mersenne Twister for Graphic Processors (MTGP): a new variant of Mersenne Twister", on the Internet at URL: http://www-.math.sci.hiroshima-u.ac.jp/~m-mat/MT/MTGP/index-jp.html for more information. However, this MTGP is different in processing steps from mt19937ar for the CPU. As a result, a random number sequence generated according to the MTGP is usually different from a random number sequence generated by the mt19937ar.

In the MTGP described in "Mersenne Twister for Graphic Processors (MTGP): a new variant of Mersenne Twister", a plurality of Mersenne Twister random number generators with different parameters from each other are provided, and different random number generators are respectively executed in different blocks of the GPU. In other words, one of the blocks corresponds to one of the random number generators. Moreover, the MTGP utilizes a high speed characteristic of a communication in the block to parallelize the random number generator in the block.

FIG. 5 schematically illustrates a configuration of the GPU 3 when random numbers are generated according to the MTGP. As illustrated in FIG. 5, the GPU 3 includes k blocks, namely first to k-th blocks. Then, each block includes a plurality of cores (not shown). The plurality of cores are responsible for execution of first to n-th threads. The thread herein means a flow of processing in a process. It should be noted that one core may be responsible for one thread, or two or more threads. Random number generators MT1 to MTk are respectively associated with the first to k-th blocks in this way. In other words, the first to k-th blocks respectively correspond to the random number generators MT1 to MTk. Processing of each of the random number generators is executed in parallel by n threads in each of the blocks.

FIG. 6 is a flowchart of random number generation processing carried out by each of the random number generators MT1 to MTk. Not only the random number generation processing in the Mersenne Twister method but also the random number generation processing in many other methods includes update processing of updating vectors referred to as state vectors, tempering processing of converting the updated state vectors into integer random numbers having favorable properties, and conversion processing of converting the integer random numbers into random numbers having another distribution. First, in Step S51, when the random number generation processing starts, the GPU 3 makes a preparation such as reading a program for the random number generation processing from the GPU memory 4. In Step S52, the value of a variable M is assigned to a variable N. This variable M along with a variable L, which is described later, is determined by a form of the execution of the Mersenne Twister method. Then, the processing proceeds to Step S53, and the update processing of the state vectors is carried out. Specifically, state bits $R_i$ (i is a natural number) are updated using recurrence equations described below.

$$R_N = F(R_{N-M}, R_{N-M+1}, R_{N-L})$$
$$R_{N+1} = F(R_{N-M+1}, R_{N-M+2}, R_{N-L+1})$$
$$\vdots$$
$$R_{N+n-1} = F(R_{N-M+n-1}, R_{N-M+n}, R_{N-L+n-1})$$

Equation 1 where the state bit $R_i$ forms a variable in K bits, F is a function including bitwise operations and the four arithmetic operations, and L and M are positive integers satisfying a relationship L<M. Those L and M are determined by the form of the execution of the Mersenne Twister method.

In Step S54, the tempering processing is carried out. Specifically, the state bits $R_i$ obtained in Step S53 are converted into integer values $S_i$ according to the following equations.

$$S_N = G(R_N)$$
$$S_{N+1} = G(R_{N+1})$$
$$\vdots$$
$$S_{N+n-1} = G(R_{N+n-1})$$

Equation 2 where G is a function including bitwise operations.

Then, Step S55, in which the conversion processing is carried out, is not an essential step, and is carried out according to necessity. Specifically, the integer values $S_i$ obtained in Step S54 are converted into uniform random numbers $T_i$ according to the following equations, and the uniform random numbers $T_i$ are stored in the GPU memory 4.

$$Mem(N) = H(S_N)$$
$$Mem(N+1) = H(S_{N+1})$$
$$\vdots$$
$$Mem(N+n-1) = H(S_{N+n-1})$$

Equation 3 where H is a function for the conversion into the uniform random number. A plurality of inputs to the function may be necessary. Moreover, Mem represents the operation of storing in the GPU memory 4. Thus, Step S55 is a step carried out when it is necessary to convert the integer values $S_i$ obtained in Step S54 into the uniform random numbers $T_i$.

In Step S56, each of the blocks determines whether a required number of random numbers have been generated. If the required number of random numbers have not been generated, the processing proceeds to Step S57, and the sum of the number n of parallel executions and the variable N is assigned to the variable N. Then, the processing of Steps S53 to S55 is carried out. If the required number of random numbers have been generated in this way, the random number generation processing is ended in Step S58.

Each of the random number generators MT1 to MTk carries out Steps S51 to S58 as described above. Moreover, the processing in Steps S53 to S57 is carried out in parallel by the n threads as illustrated in FIG. 6.

NVIDIA Corporation in the U.S., which is a developer of GPUs, disclosed Mersenne Twister random number generators as a sample of the parallelization of random number generators (refer to NVIDIA Corporation in the U.S., "CUDA ZONE", on the Internet at http://www.nvidia.co.jp/object/cuda_get_samples_jp.html). In a form according to NVIDIA Corporation in the U.S., one random number generator is assigned to each thread, thereby causing the random number generators to generate random numbers in parallel. FIG. 7 schematically illustrates a configuration of a GPU when the random numbers are generated according to the form of NVIDIA Corporation in the U.S. As illustrated in FIG. 7, first to m-th threads in a first block are respectively responsible for first to m-th random number generators MT1 to MTm. First to m-th threads in a second block are respectively responsible for (m+1)th to 2m-th random number generators MTm+1 to MT2m. Similarly, first to m-th threads in the k-th block are respectively responsible for ((k−1)m+1)th to km-th random number generators MT(k−1)m+1 to MTkm. Thus, one random number generator is assigned to one thread. In other words, one thread corresponds to one random number generator. The processing in each thread is the same as the ordinary Mersenne Twister algorithm.

The existing MTGP achieves the parallelism by running the plurality of random number generators in parallel as illustrated in FIG. 5. However, the existing MTGP generates only a random number sequence in which random numbers obtained from the plurality of random number generators are mixed, and thus generates a random number sequence substantially different from a random number sequence obtained by a single random number generator. In other words, mt19937ar, which is serial processing, and the MTGP, which is parallel processing, are different from each other in obtained random number sequences, and reproducibility of a result of executing the Monte Carlo method is lost as a result. This reproducibility is indispensable when carrying out a backtesting or examining influence exerted when computation conditions are changed in fields of the financial engineering and the like. If a single random number generator is employed, the reproducibility in the MTGP can be retained. However, this means that only one block is used in the GPU, and computing resources in the other blocks are thus wasted. This holds true for the form of the NVIDIA Corporation in the U.S. illustrated in FIG. 7. Moreover, there is a problem in that the execution speed of each of the random number generators is not fast.

SUMMARY OF THE INVENTION

It is therefore an object of the present invention to more efficiently generate a random number sequence which is the same as the one obtained through random number generation processing performed in a serial manner, by parallelizing a single random number generator on a GPU.

The present invention is devised by focusing on a point that a degree of parallelism in update processing and a degree of parallelism in tempering processing and conversion processing are different from each other. First, in the update processing, assuming that n≤L, n state bits $R_N$ to $R_{N+n-1}$ have no data dependency on each other, and hence the calculation of the state bits can thus be carried out at the same time. In other words, one block in a GPU can be used to generate a plurality of threads, thereby carrying out the update processing in parallel. The restriction on the GPU, which allows only the same operation to be carried out at the same time, is properly exploited in this way, thereby parallelizing the update processing.

On the other hand, integer values $S_i$ in the tempering processing do not have data dependency on each other with respect to any subscript i. Therefore, a freely selected number of $S_i$ can be calculated in parallel. In other words, the tempering processing can be carried out in parallel using a plurality of blocks in the GPU.

Moreover, random numbers $T_i$ (=$H(S_i)$) in the conversion processing do not have data dependency on each other with respect to any subscript i. Therefore, a freely selected number of $T_i$ can be calculated in parallel. In other words, the conversion processing can also be carried out in parallel using a plurality of blocks in the GPU.

In this way, efficiency of the computing is increased by separating the update processing from the tempering processing and the conversion processing, in which a degree of parallelism of the update processing is different from a degree of parallelism of the tempering processing and the conversion processing, and carrying out respective pieces of the processing at different numbers of parallel executions in the GPU. Specifically, the update processing is carried out at the degree n of parallelism, which is close to the integer L, employing one block in the GPU. On the other hand, the tempering processing and the conversion processing are carried out at such a degree of parallelism that utilizes the computing resources of the GPU as much as possible, by employing a plurality of blocks in the GPU. This configuration enables computing resources to be efficiently used when a single random number generator is used for generating random numbers.

First, the present invention provides a method of carrying out random number generation processing by using a GPU including a plurality of blocks each including at least one core, the random number generation processing including: update processing of updating state vectors; and conversion processing of converting the updated state vectors into random numbers having another distribution. The method includes: carrying out, by one of the plurality of blocks, the update processing; and carrying out, by the plurality of blocks, the conversion processing in parallel based on results of the update processing.

Furthermore, the present invention provides a method of carrying out random number generation processing by using a GPU including a plurality of blocks each including at least one core, the random number generation processing including: update processing of updating state vectors; tempering processing of converting the updated state vectors into integer random numbers; and conversion processing of converting the integer random numbers generated as results of the conversion into random numbers having another distribution. The method includes: carrying out, by one of the plurality of blocks, the update processing; and carrying out, by the plurality of blocks, the tempering processing and the conversion processing in parallel based on results of the update processing.

In the above-mentioned method, a number of threads, which are generated by the plurality of blocks when carrying out the conversion processing or when carrying out the tempering processing and the conversion processing, may be greater than the number of threads which are generated by the one of the plurality of blocks when carrying out the update processing.

Furthermore, the present invention provides a computer program for causing a GPU including a plurality of blocks each including at least one core to carry out random number generation processing including: update processing of updating state vectors; and conversion processing of converting the updated state vectors into random numbers having another distribution. The computer program causes the GPU to carry out, by one of the plurality of blocks, the update processing, and to carry out, by the plurality of blocks, the conversion processing in parallel based on results of the update processing.

Furthermore, the present invention provides a computer program for causing a GPU including a plurality of blocks each including at least one core to carry out random number generation processing including update processing of updating state vectors; tempering processing of converting the updated state vectors into integer random numbers, and conversion processing of converting the integer random numbers generated as results of the conversion into random numbers having another distribution. The computer program causes the GPU to carry out, by one of the plurality of blocks, the update processing, and to carry out, by the plurality of blocks, the tempering processing and the conversion processing in parallel based on results of the update processing.

In the above-mentioned computer program, a number of threads, which are generated by the plurality of blocks when carrying out the conversion processing or when carrying out the tempering processing and the conversion processing, may be greater than the number of threads which are generated by the one of the plurality of blocks when carrying out the update processing.

Furthermore, the present invention provides a computing device, which includes a GPU including a plurality of blocks each including at least one core, and carries out random number generation processing including update processing of updating state vectors, and conversion processing of converting the updated state vectors into random numbers having another distribution, in which the computing device is configured to carry out, by one of the plurality of blocks, the update processing and to carry out, by the plurality of blocks, the conversion processing in parallel based on results of the update processing.

Furthermore, the present invention provides a computing device, which includes a GPU including a plurality of blocks each including at least one core, and carries out random number generation processing including update processing of updating state vectors, tempering processing of converting the updated state vectors into integer random numbers, and conversion processing of converting the integer random numbers generated as results of the conversion into random numbers having another distribution, in which the computing device is configured to carry out, by one of the plurality of blocks, the update processing, and to carry out, by the plurality of blocks, the tempering processing and the conversion processing in parallel based on results of the update processing.

In the above-mentioned computing device, a number of threads, which are generated by the plurality of blocks when carrying out the conversion processing or when carrying out the tempering processing and the conversion processing, may be greater than the number of threads, which are generated by the one of the plurality of blocks when carrying out the update processing.

"Random number" in the specification and the claims is a concept including a pseudorandom number and a quasi-random number. It is well known that it is impossible to generate random numbers in a purely mathematical sense using digital computers, and the term "random number" is herein used in a broad sense so as to include pseudorandom numbers, which are sufficiently random for carrying out the Monte Carlo method, and highly regular quasi-random numbers, which are often used for the numerical integration.

According to the present invention, it is possible to efficiently generate a random number sequence by realizing a single random number generator on a GPU.

DETAILED DESCRIPTION OF THE PREFERRED EMBODIMENTS

Figure 1:
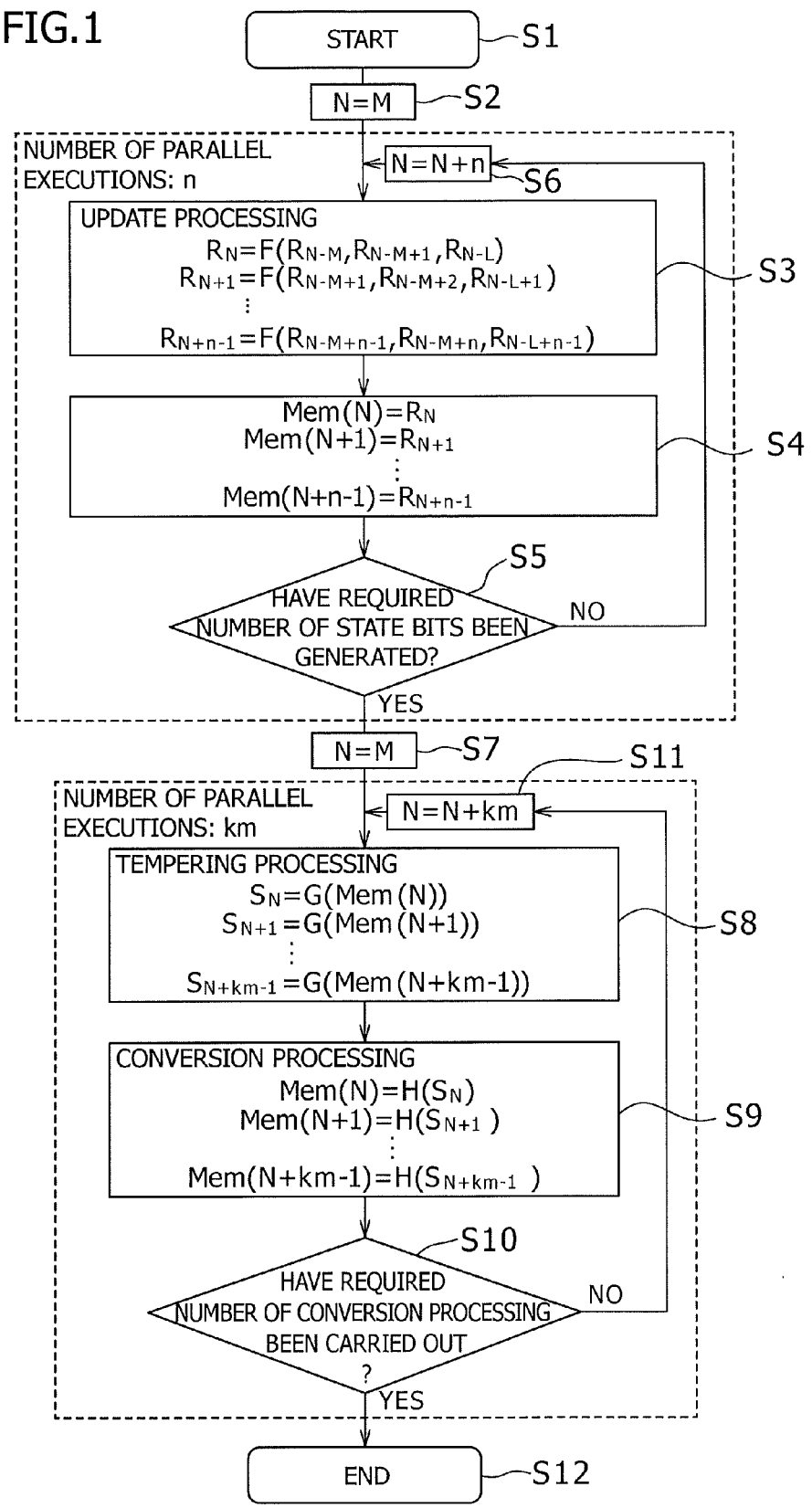
FIG. 1 is an example of a flowchart of generating random numbers according to the present invention.

FIG. 1 is a flowchart of generating random numbers according to the present invention. Configurations of a GPU when the processing illustrated in FIG. 1 is carried out are schematically illustrated in diagrams of FIGS. 2 and 3. First, in Step S1, when the random number generation processing starts, the GPU 3 makes a preparation such as reading a program for update processing from a GPU memory 4. In Step S2, the value of a variable M is assigned to a variable N. This variable M along with a variable L, which is described later, is determined by a form of the execution of the Mersenne Twister method. In Step S3, update processing of state vectors is carried out. This update processing uses n threads generated in a single block to update n state bits $R_N$ to $R_{N+n-1}$ in parallel according to the following equations.

$$R_N = F(R_{N-M}, R_{N-M+1}, R_{N-L}) \quad \text{Equation 4}$$
$$R_{N+1} = F(R_{N-M+1}, R_{N-M+2}, R_{N-L+1})$$
$$\vdots$$
$$R_{N+n-1} = F(R_{N-M+n-1}, R_{N-M+n}, R_{N-L+n-1})$$

where the state bit $R_i$ forms a variable in K bits, F is a function including bitwise operations and the four arithmetic operations, and L and M are positive integers satisfying the relationship L<M. Those L and M are determined by the form of the execution of the Mersenne Twister method.

In Step S4, processing of storing the n state bits $R_N$ to $R_{N+n-1}$ generated in Step S3 in a global memory is carried out in parallel according to the following equations.

$$Mem(N) = R_N \quad \text{Equation 5}$$
$$Mem(N+1) = R_{N+1}$$
$$\vdots$$
$$Mem(N+n-1) = R_{N+n-1}$$

where Mem represents the operation of storing in the global memory.

In Step S5, it is determined whether a required number of state bits $R_i$ have been generated. If the required number of state bits have not been generated, the processing proceeds to Step S6, and the sum of the number n of parallel executions and the variable N is assigned to the variable N. Then, the processing of Steps S3 and S4 is carried out. In this way, Steps S3 and S4 are repeated until the required number of random numbers have been generated.

Figure 2:
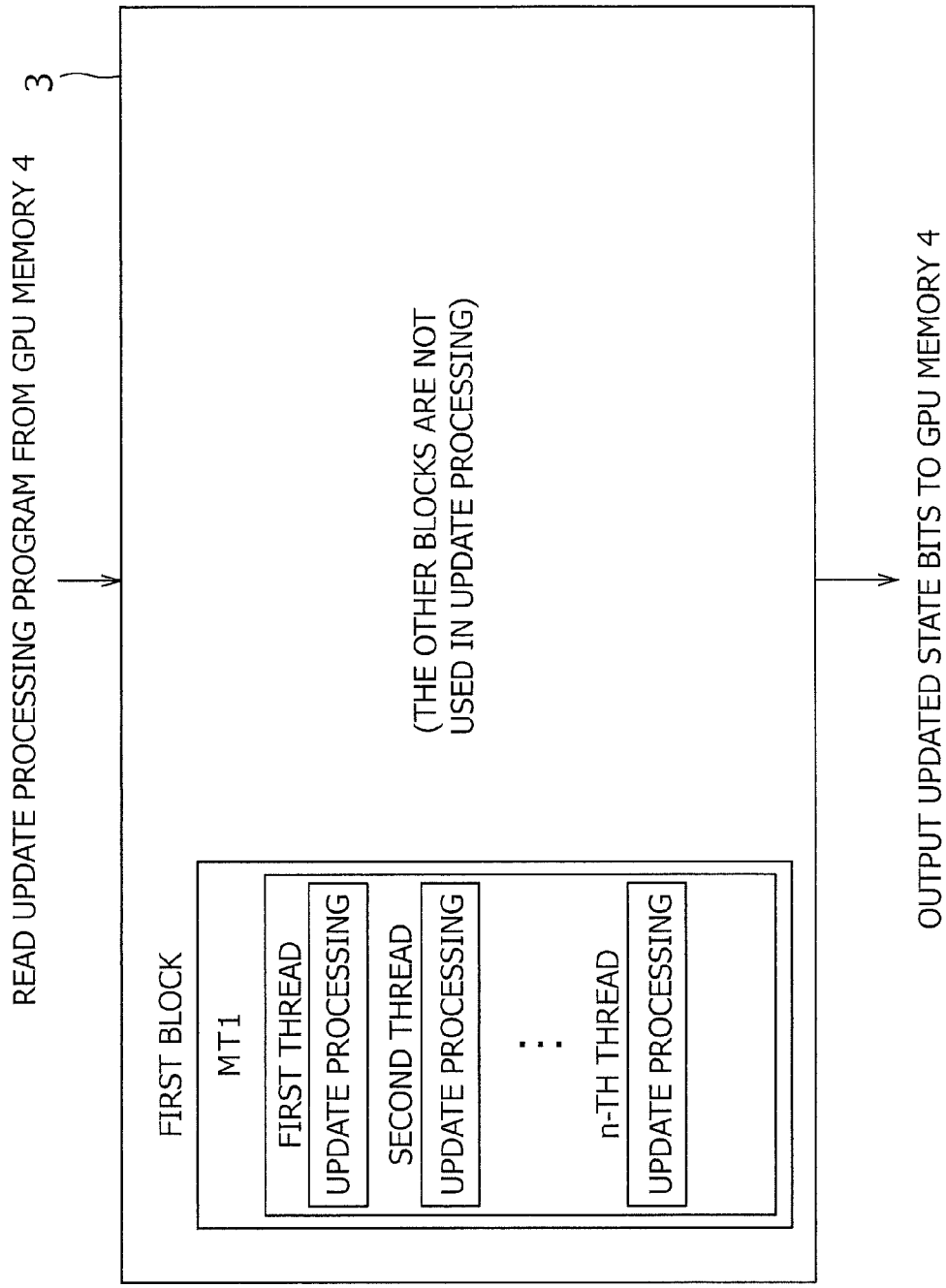
FIG. 2 is a diagram schematically illustrating a configuration of a GPU when update processing is carried out.

As illustrated in FIGS. 1 and 2, each of Steps S3 to S6 is processed in parallel by n threads generated in the single block in the GPU 3. The other blocks are not used on this occasion. Specifically, although data is exchanged between threads in the update processing, an access to the global memory, which takes time, can be avoided by carrying out the parallel processing in the single block. The block which is responsible for the update processing is not limited to the first block, and may be any one of the blocks.

When the required number of state bits $R_i$ have been generated, the processing proceeds to Step S7, in which the value of the variable M is assigned to the variable N, and at the same time, a program for tempering processing and conversion processing is read from the GPU memory 4.

In Step S8, the tempering processing is carried out. Specifically, the values of the state bits $R_i$ are obtained from the global memory, and the state bits are converted into integer random numbers $S_i$. This conversion is represented by the following equations.

$$S_N = G(Mem(N)) \quad \text{Equation 6}$$
$$S_{N+1} = G(Mem(N+1))$$
$$\vdots$$
$$S_{N+km-1} = G(Mem(N+km-1))$$

where G is a function including bitwise operations.

In Step S9, the conversion processing is carried out. Specifically, the integer random numbers $S_i$ are converted into random numbers $H(S_i)$ having a freely selected distribution, and the random numbers $H(S_i)$ are stored in the global memory. This conversion is represented by the following equations.

$$Mem(N) = H(S_N) \quad \text{Equation 7}$$
$$Mem(N+1) = H(S_{N+1})$$
$$\vdots$$
$$Mem(N+km-1) = H(S_{N+km-1})$$

where H is a conversion function into random numbers having respective distributions. Examples thereof include conversion functions into the continuous uniform distribution and the normal distribution. A plurality of inputs to the function may be necessary. Furthermore, Mem represents the operation of storing in the GPU memory 4.

In Step S10, it is determined whether a required number of the conversions have been carried out. If the required number of the conversions have not been carried out, the processing proceeds to Step S11, and the sum of the number k×m of parallel executions and the variable N is assigned to the variable N. It should be noted that k is the number of the blocks in the GPU, and m is the number of the threads in each of the blocks. Then, the processing of Steps S8 and S9 is carried out.

In this way, Steps S8 and S9 are repeated until the required number of conversions have been carried out. The processing is then ended in Step S12.

Figure 3:
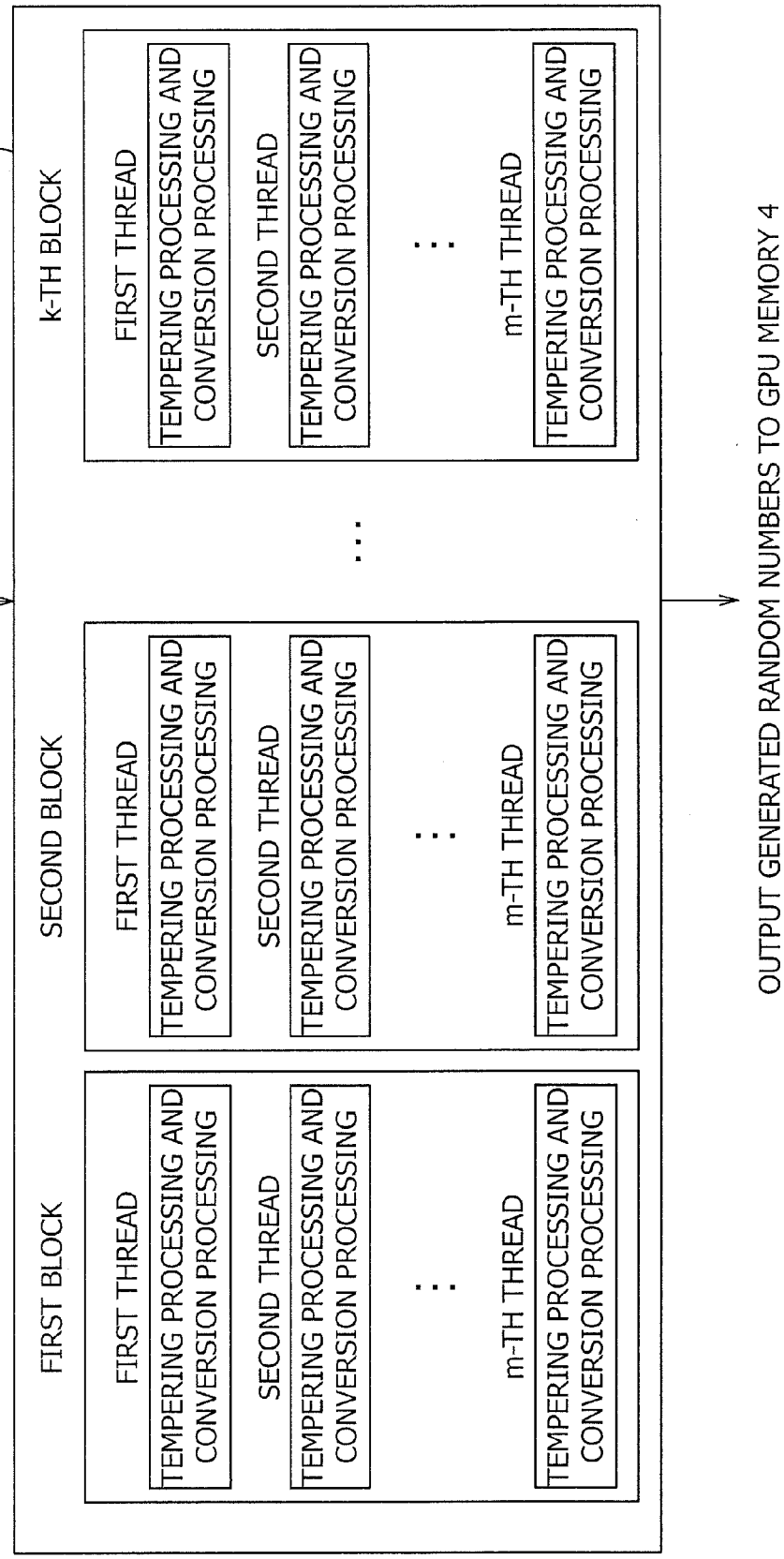
FIG. 3 is a diagram schematically illustrating a configuration of the GPU when tempering processing and conversion processing are carried out.
Figure 4:
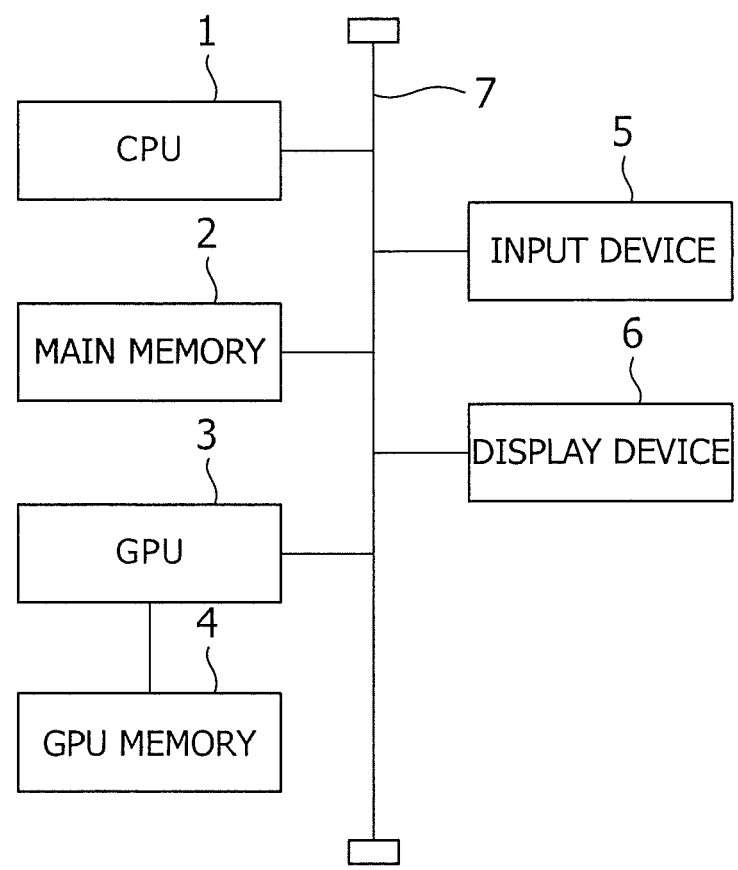
FIG. 4 is a block diagram of a computing device provided with a GPU.
Figure 5:
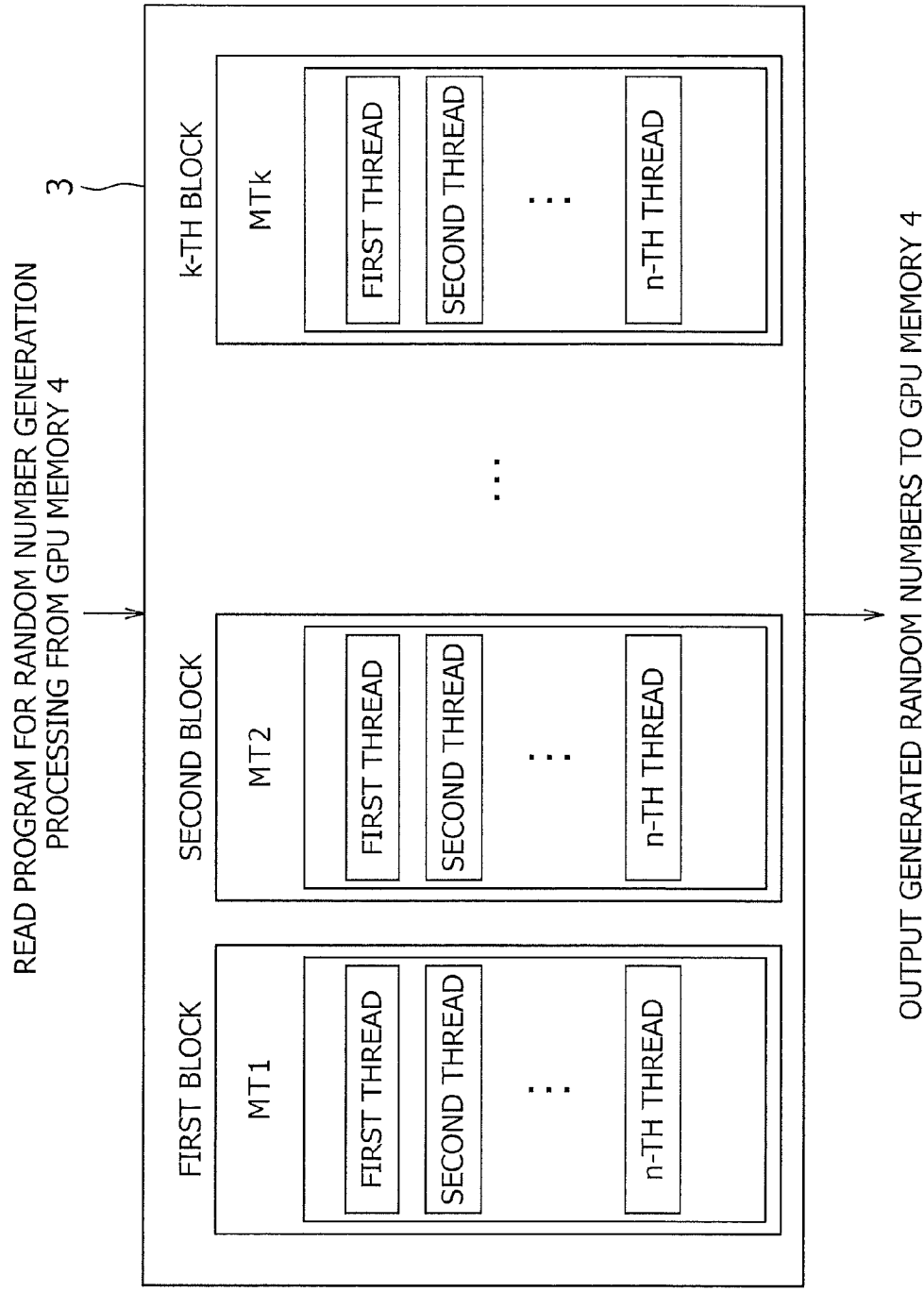
FIG. 5 is a diagram schematically illustrating a configuration of the GPU when random numbers are generated according to MTGP.
Figure 6:
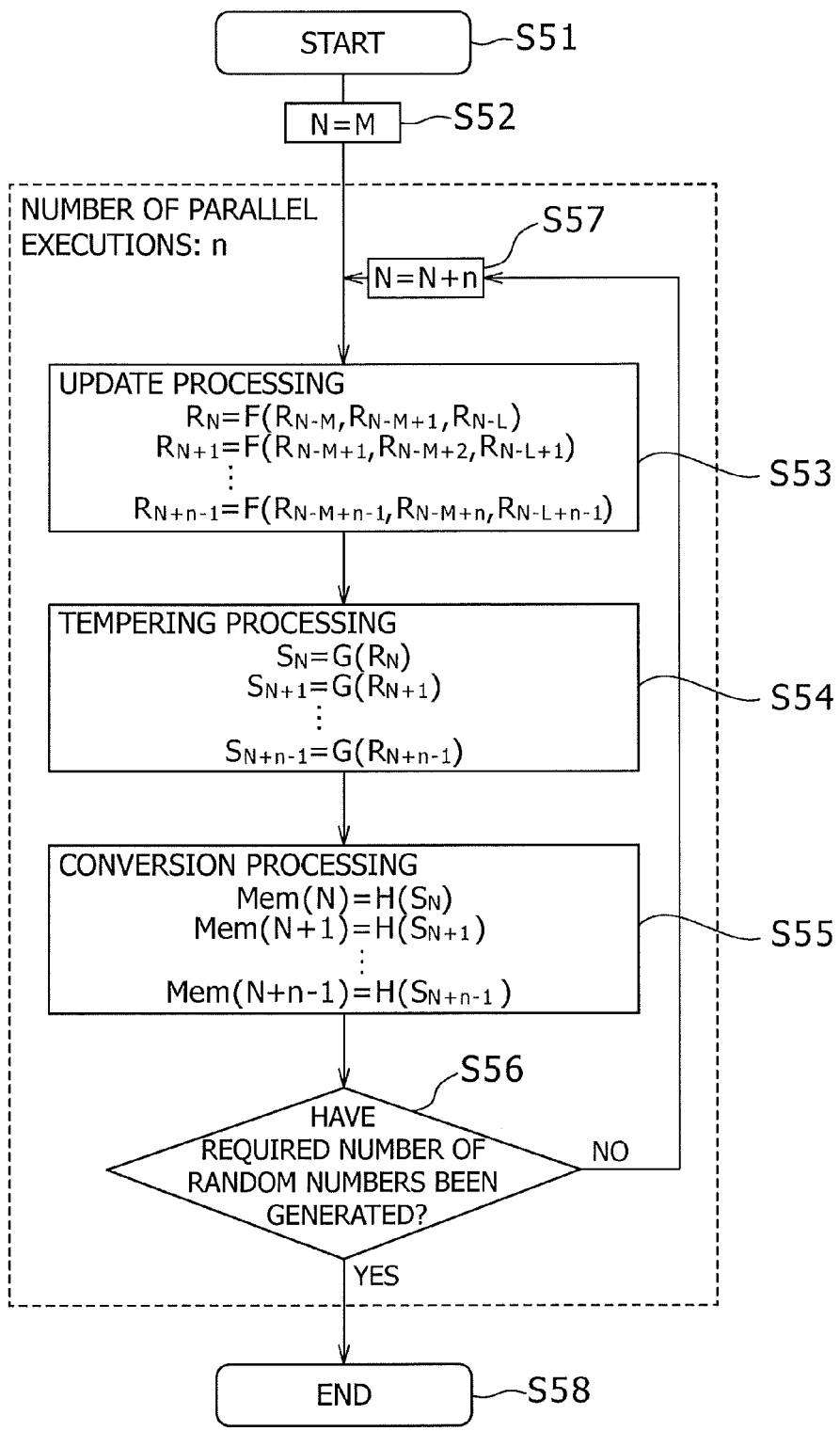
FIG. 6 is a flowchart of random number generation processing performed according to the MTGP.
Figure 7:
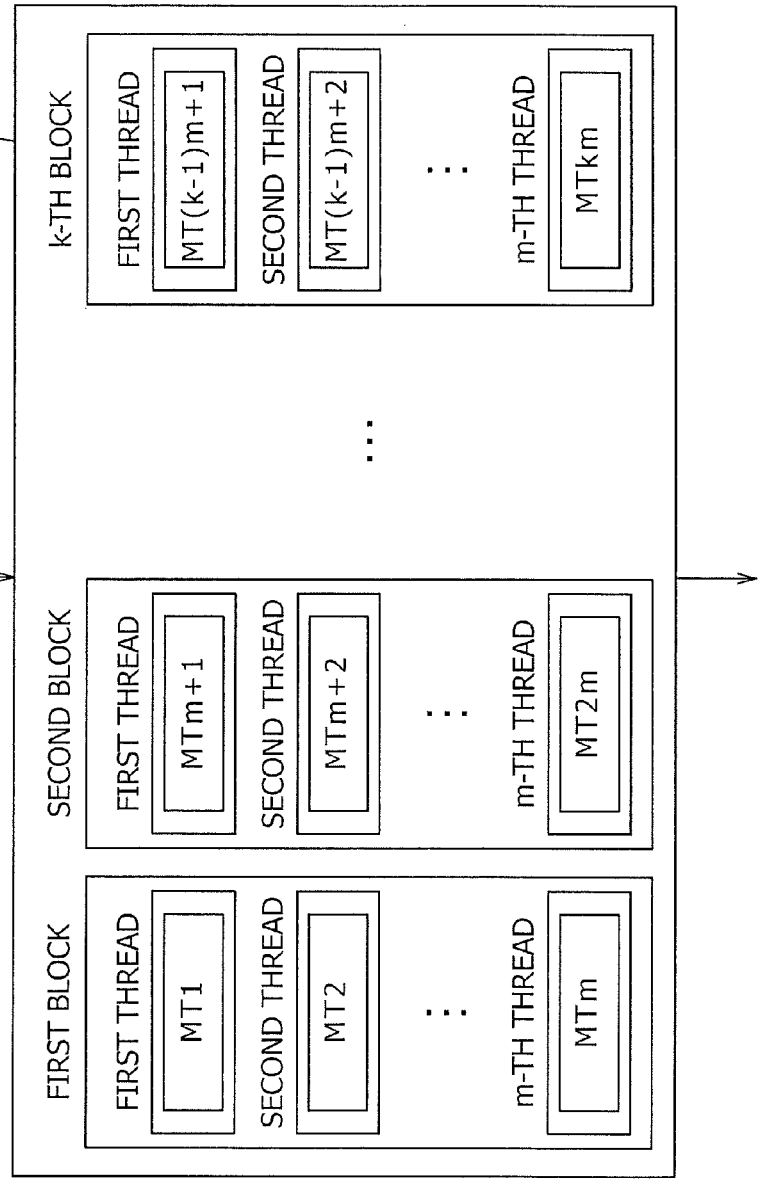
FIG. 7 is a diagram schematically illustrating a configuration of a GPU when random numbers are generated according to a form of NVIDIA Corporation in the U.S.

As illustrated in FIGS. 1 and 3, each of Steps S8 to S11 is processed in parallel by the total of k×m threads. In other words, the computing resources in the GPU can be efficiently used.

As described above, the data is exchanged between threads in the update processing, and hence, as illustrated in FIG. 2, a single random number generator is shared among threads in one block, thereby carrying out the calculation only in the one block, and storing the result thereof in the global memory. On the other hand, there is no data dependency in the tempering processing and the conversion processing, and the entire computing resources in the GPU can thus be used as illustrated in FIG. 3. As a result, the reproducibility of a result of execution of the Monte Carlo method can be retained, and at the same time, the computing resources can be efficiently used, while waste thereof is reduced.

EXAMPLES

As Example 1, the standard code of the 2002 version of the Mersenne Twister written in the C language "mt19937ar" was executed by the GPU according to the embodiment described above. One hundred million integer random numbers, continuous uniform random numbers, and normal random numbers were generated, respectively, and execution times for generating these random numbers were measured. On this occasion, the update processing was separated from the tempering processing and the conversion processing. The number of parallel executions of the update processing was 1 block× 224 threads, and the number of parallel executions of the tempering processing and the conversion processing was 28 blocks×64 threads.

On the other hand, mt19937ar was executed on a CPU as Comparative Example 1. Furthermore, as Comparative Example 2, the update processing, the tempering processing, and the conversion processing were not separated, and all pieces of the processing were executed in one block in the GPU. One hundred million integer random numbers, continuous uniform random numbers, and normal random numbers were generated, respectively, both in Comparative Examples 1 and 2.

The Moro inverse function method was used for the conversion processing into the normal random numbers all in Example 1, Comparative Example 1, and Comparative Example 2. Refer to Moro, B., "The Full Monte," Risk, Vol. 8, No. 2, 1995", for more detail. Precision T5500 from Dell, Inc., in the U.S. equipped with Tesla C2050, which is a GPU from NVIDIA Corporation in the U.S., was used as the verification environment. Details thereof are shown in Table 1.

TABLE 1

| Verification environment | |
|---|---|
| CPU | Intel Xeon E5520 |
| Memory | 4GB |
| GPU | Tesla C2050 |
| OS | Windows 7 64-bit |
| Compiler | Visual Studio 2005 SP1 CUDA 3.1 |
| Optimization option | O2 |

The execution times of Example 1, Comparative Example 1, and Comparative Example 2 under the conditions described above are shown in Table 2. In the case of generating the integer random numbers, the execution time was reduced in Example 1 by approximately 81.6% compared with Comparative Example 1. In the case of generating the normal random numbers, the execution time was reduced in Example 1 by approximately 94.6% compared with Comparative Example 1. Similarly, in the case of generating the normal random numbers, the execution time was reduced in Example 1 by approximately 84.1% even compared with Comparative Example 2.

TABLE 2

Execution times of mt19937ar

| | Example 1 (GPU, with separation) | Comparative Example 1 (CPU) | Comparative Example 2 (GPU, without separation) |
|---|---|---|---|
| Integer random numbers | 130 ms | 705 ms | 174 ms |
| Continuous uniform random numbers | 152 ms | 1579 ms | 523 ms |
| Normal random numbers | 227 ms | 4216 ms | 1426 ms |

The Mersenne Twister method was used as the random number generation algorithm in the above-mentioned embodiment and examples. However, the random number generation algorithm is not limited to the Mersenne Twister method, and other algorithms such as the linear congruence method may be used. Many other random number generation algorithms include the update processing of updating state vectors, and the conversion processing of converting the updated state vectors themselves into random numbers having another distribution, and do not include the tempering processing. This is because the state vectors updated in the update processing are by themselves integer random numbers, and the tempering processing is thus not necessary. Those algorithms without the tempering processing may be used. If the algorithm without the tempering processing is used, any one of the blocks in a GPU carries out the update processing of the state vectors, and all the blocks in the GPU then carry out the conversion processing of the updated state vectors. Furthermore, a quasi-random number generation algorithm including at least the update processing and the conversion processing may be employed in another embodiment. Still further, a configuration in which one core is responsible for one thread may be provided, and a configuration in which one core is responsible for a plurality of threads may also be provided.

Furthermore, a hardware configuration of a computer for embodying the embodiment of the present invention is not specifically limited to the illustrated configuration, and may be a configuration having one or more dedicated numerical operation units according to the form of numerical operations, or may be a cluster configuration in which computers are distributed in a plurality of housings connected via a network. Throughout the description of the present invention as well as in this embodiment, functional means described as separated are realized by freely selected components that practically provide such separated functions. On this occasion, the present invention is not limited by attributes which do not constitute restriction imposed on achieving the functions, such as the physical number of the components and a relationship in location among the components if a plurality of components are provided. For example, a configuration in which a plurality of separated functions are executed by a single component in different timings over time is also included in the scope of the present invention.

A software configuration for numerical calculation in a computer, which realizes the functional processing of the embodiment of the present invention, may be a freely selected configuration as long as the numerical information processing of the embodiment of the present invention is realized. The computer is installed with software for hardware control, such as a basic input/output system (BIOS), and is managed by an operating system (OS) which cooperates with the software to perform file input/output and allocation of hardware resources. The OS can execute an application program which operates in cooperation with the OS and the hardware, based on an explicit instruction from a user, an indirect instruction from the user, or an instruction from another program, for example. The application program is properly programmed depending on procedures defined by the OS so as to enable those operations and to operate in cooperation with the OS, or is programmed independently of the OS. When the embodiment of the present invention is realized, generally, processing such as numerical calculations and file input/output is executed in the form of a dedicated application program. However, the present invention is not limited to this configuration. A method or a program of the present invention may be realized by any other freely selected embodiment, such as by using a plurality of dedicated or general-purpose application programs, by partially using existing numerical calculation libraries, or by employing a network programming method so as to be processed by hardware of other computers. Software describing a series of instructions for carrying out the computing method of the embodiment of the present invention on a computer is thus simply referred to as a program. The program is described by a freely selected form executable on the computer, or a freely selected form which can be eventually converted into such a form.

A program of the embodiment of the present invention is configured such that computing means such as a GPU, which is a hardware resource, receives an instruction from a computing program via an OS or without intervention of the OS, and carries out computing processing via a proper bus, which is a hardware resource, in cooperation with storage means such as a main memory or an auxiliary storage device, which is a hardware resource. In other words, the information processing by means of the software, which realizes the computing method of the embodiment of the present invention, is realized by those hardware resources. The storage means or storage unit refers to a part, the entirety, or a combination of information storage media which are logically partitioned into freely selected units, and from which information can be read out by a computer. The storage means is realized by freely selected hardware resources such as a cache memory in a GPU, a memory connected to the GPU, and a non-volatile storage medium connected via a proper bus to the GPU, such as a hard disk drive. The storage means includes freely selected means which is realized in a freely selected form such as an area in a memory specified by an architecture of the GPU, a file or a folder on a file system managed by the OS, and a list or a record in an accessible database management system on the same computer or any computer on a network, or a record in a plurality of lists related to each other and managed by a relational database. The storage means is logically partitioned from the other storage means, and is capable of at least temporarily storing or recording information in an identifiable manner.

What is claimed is:

1. A method of carrying out random number generation processing by using a GPU including a plurality of blocks each including at least one core, the random number generation processing including: update processing of updating state vectors; and conversion processing of converting the updated state vectors into random numbers having another distribution, comprising:
    carrying out, by parallel processing in a single one of the plurality of blocks, the update processing; and
    carrying out, by the plurality of blocks, the conversion processing in parallel based on results of the update processing.

2. A method according to claim 1, wherein a number of threads, which are generated by the plurality of blocks when carrying out the conversion processing, is larger than a number of threads, which are generated by the one of the plurality of blocks when carrying out the update processing.

3. A method of carrying out random number generation processing by using a GPU including a plurality of blocks each including at least one core, the random number generation processing including: update processing of updating state vectors; tempering processing of converting the updated state vectors into integer random numbers; and conversion processing of converting the integer random numbers generated as results of the conversion into random numbers having another distribution, comprising:
    carrying out, by parallel processing in a single one of the plurality of blocks, the update processing; and
    carrying out, by the plurality of blocks, the tempering processing and the conversion processing in parallel based on results of the update processing.

4. A method according to claim 3, wherein a number of threads, which are generated by the plurality of blocks when carrying out the tempering processing and the conversion processing, is larger than a number of threads, which are generated by the one of the plurality of blocks when carrying out the update processing.

5. A nontransitory computer readable medium encoded with a computer program for causing a GPU including a plurality of blocks each including at least one core to carry out random number generation processing including: update processing of updating state vectors; and conversion processing of converting the updated state vectors into random numbers having another distribution,
    the computer program causing the GPU to:
    carry out, by parallel processing in a single one of the plurality of blocks, the update processing; and
    carry out, by the plurality of blocks, the conversion processing in parallel based on results of the update processing.

6. The nontransitory computer readable medium encoded with a computer program according to claim 5, wherein a number of threads, which are generated by the plurality of blocks when carrying out the conversion processing, is larger than a number of threads, which are generated by the one of the plurality of blocks when carrying out the update processing.

7. A nontransitory computer readable medium encoded with a computer program for causing a GPU including a plurality of blocks each including at least one core to carry out random number generation processing including: update processing of updating state vectors; tempering processing of converting the updated state vectors into integer random numbers; and conversion processing of converting the integer random numbers generated as results of the conversion into random numbers having another distribution, the computer program causing the GPU to:

carry out, by parallel processing in a single one of the plurality of blocks, the update processing; and carry out, by the plurality of blocks, the tempering processing and the conversion processing in parallel based on results of the update processing.

8. The nontransitory computer readable medium encoded with a computer program according to claim 7, wherein a number of threads, which are generated by the plurality of blocks when carrying out the tempering processing and the conversion processing, is larger than a number of threads, which are generated by the one of the plurality of blocks when carrying out the update processing.

9. A computing device, which comprises a GPU including a plurality of blocks each including at least one core, and carries out random number generation processing including: update processing of updating state vectors; and conversion processing of converting the updated state vectors into random numbers having another distribution, wherein the computing device is configured to:

carry out, by parallel processing in a single one of the plurality of blocks, the update processing; and carry out, by the plurality of blocks, the conversion processing in parallel based on results of the update processing.

10. A computing device according to claim 9, wherein a number of threads, which are generated by the plurality of blocks when carrying out the conversion processing, is larger than a number of threads, which are generated by the one of the plurality of blocks when carrying out the update processing.

11. A computing device, which comprises a GPU including a plurality of blocks each including at least one core, and carries out random number generation processing including: update processing of updating state vectors; tempering processing of converting the updated state vectors into integer random numbers; and conversion processing of converting the integer random numbers generated as results of the conversion into random numbers having another distribution, wherein the computing device is configured to:

carry out, by parallel processing in a single one of the plurality of blocks, the update processing; and carry out, by the plurality of blocks, the tempering processing and the conversion processing in parallel based on results of the update processing.

12. A computing device according to claim 11, wherein a number of threads, which are generated by the plurality of blocks when carrying out the tempering processing and the conversion processing, is larger than a number of threads, which are generated by the one of the plurality of blocks when carrying out the update processing.

* * * * *